United States Patent Office 3,173,964
Patented Mar. 16, 1965

3,173,964
REDUCTION OF 1,5,9-CYCLODODECATRIENE TO CYCLODODECENE WITH LITHIUM METAL IN ETHYL AMINE
Robert H. Perry, Jr., Baytown, Tex., assignor, by mesne assignments, to Esso Research and Engineering Company, Elizabeth, N.J., a corporation of Delaware
No Drawing. Filed Feb. 16, 1961, Ser. No. 89,632
2 Claims. (Cl. 260—666)

This invention is directed to the reduction of nonconjugated cyclic polyolefins. More particularly the invention is directed to a method of producing alpha-omega dicarboxylic acids from cyclic polyolefins wherein the double bonds are not of the conjugated form. In its most specific aspect, the invention is directed to the production of 1,12-dodecandedioic acid by the reduction and oxidation of 1,5,9-cyclododecatriene.

In the prior art it has been thought to be impossible to reduce nonconjugated cyclic polyolefins in a single step, particularly when using active metals as the reducing agent. The reduction of nonconjugated cyclic polyolefins with these agents has been accomplished with very great difficulty, if at all, and never in a single step process. By the practice of the present invention, however, this reduction is accomplished in a single step by utilizing lithium metal in ethyl amine as the reducing agent. In the case of monoolefin production by this single-step reduction, it is now possible to produce alpha-omega dicarboxylic acids from the nonoconjugated cyclic polyolefins, by reducing them selectively to monoolefins, ozonizing the monoolefin to produce an intermediate and then oxidizing and hydrolyzing this intermediate to produce the final product, alpha-omega dicarboxylic acid.

The general reduction process finds utility in reducing, for example, trienes of the nonconjugated form to monoolefins, or dienes of the nonconjugated form to saturated hydrocarbons. For example, 1,4-cyclohexadiene, 1,4-cyclooctadiene, 1,5-cyclooctadiene, etc. can be reduced in a single step to the corresponding cyclic saturated hydrocarbon. The reduction of triolefins to monoolefins is exemplified by the reduction of 1,5,9-cyclododecatriene to cyclododecene. It is to be stressed in the accomplishment of the reduction step, that the nonconjugated polyolefins are reduced in a single process step. The conditions obtaining in the practice of the reduction step of the present invention may be varied over relatively large ranges. The theoretical requirement for the amount of lithium in ethyl amine used is such that one lithium reacts with one ethyl amine to give one-half mol of hydrogen; consequently, if one double bond is to be reduced, two g-atoms of lithium and two mols of ethyl amine would theoretically be required. If two double bonds are to be reduced, four parts of each are theoretically required. In actual fact, considerably more of each of these may be required because much of the hydrogen formed in the reaction is liberated as a gas and may pass from the solution without entering into the reduction reaction. Also, since the ethyl amine is a good solvent for the reaction, a large excess thereof is suitably provided. The relative amounts of the reagents may thus vary over a wide operable range. Lithium-to-olefin mol ratios of 4:1 to about 10:1 may be employed, while ethyl amine-to-olefin ratios of 4:1 to about 20:1 are suitable. The temperature may range between about −78° C. and about +150° C. Likewise, the pressure under which the reaction is carried out may vary between 0 p.s.i.g. and 1000 p.s.i.g. Normally and preferably, temperatures of 5° C. to 20° C. and atmospheric pressure will be employed. The time of reaction is adjusted in accordance with the concentration of the reactants and the temperature range to be utilized. A specific example of the reduction step is given below.

*Example I*

A portion of cyclododecatriene, 16.2 g., or 0.1 mol) was treated with a solution of 5.6 g. (0.8 g-atom) of lithium metal in 150 ml. of ethyl amine, at 10° C. to 15° C. The reaction was carried out for a period of 12 hours, at atmospheric pressure. At the termination of the reaction period, ethyl amine was allowed to evaporate spontaneously, and the hydrocarbon product was distilled, giving a liquid product containing cyclododecene (80% yield), the remainder being cyclododecane together with traces (1 to 2%) of cyclododecatriene and cyclododecadiene.

The commercial importance of this reduction step may be seen in the utility of the monolefins as a starting material in the production of alpha-omega dicarboxylic acids. These acids are produced by ozonizing the monoolefins produced by the reduction step of the present invention to produce an intermediate product which is then oxidized to the acid form. This ozonolysis is carried forth generally as follows: the monoolefin is dissolved in a reactive or unreactive solvent such as methanol, acetic acid, chloroform, ethyl acetate, etc., and is contacted with a gaseous stream containing from about 1% to about 6% by wt. ozone, at a rate of about 5 vols. gas/vol. liq./min. until one mol of ozone per mol of monoolefin has been absorbed, at temperatures within the range of −78° C. to about +30° C., and at pressures within the range of about 0 to 10 p.s.i.g. The product of the ozonolysis, depending on the type of solvent selected, may be either peroxidic in form or an ozonide. In either event, the single, unsaturated bond in the cycloolefin has been attacked and upon further oxidation will split the ring at this position to form the desired alpha-omega dicarboxylic acid. One manner of accomplishing this oxidation is by contacting the intermediate product in the ozonolysis solvent, for example, with hydrogen peroxide to split the cyclic ring and produce aldehydic groupings at each end of the resultant aliphatic hydrocarbon. Further oxidation of the aldehydric groups with the hydrogen peroxide, in the presence of an organic acid such as formic acid, produces the desired carboxylic acid grouping at each end of the straight-chain product. The hydrogen peroxide may be used in a mol ratio of 1 to 10 mols hydrogen peroxide per mol of olefin charged to the ozonolysis reaction, and the formic acid is present in excess of stoichiometric requirements. The temperature during the oxidation step may range between 25° and 150° C. (normally between 50° C. to 100° C.), while the pressure used is of no practical significance so long as the liquid phase is maintained.

Other methods of oxidation can also be employed. For example, an oxygen-bearing gaseous stream utilizing a catalytic amount of ozone may be used to perform the oxidation, as set forth in Example IV, infra, or an oxidation catalyst such as cobaltous acetate tetrahydrate may be used as shown in Example III, infra. As specific examples of the oxidation of the intermediate product produced by the production step, Examples II, III, and IV are given below.

*Example II*

The cyclododecene product of Example I is dissolved in methanol to produce a solution containing about 10% cyclododecene. A gaseous stream containing 4% ozone is bubbled through the resultant solution at a rate of about 0.02 standard cubic feet per minute. This ozonolysis process is continued at about 0° C. until one molar equivalent is absorbed. After the completion of the ozonolysis step, the methanol solvent is removed under reduced pressure and to the peroxidic residue are added 30 g. of 30% hydrogen peroxide and 50 ml. of formic acid. The mixture is stirred to dissolve the peroxide, following which it is heated to 50° C. to 60° C. and maintained at this temperature by water-bath cooling to control the highly exothermic reaction. After about 15 minutes, the solution is heated to 95° C. to 100° C. for one hour. Upon cooling the solution, the acid product of these reactions precipitates, is recovered by filtration, washed, dried, and found to be very pure dodecane-1,12-dioic acid. The yield is 78% of theoretical based upon the cyclododecatriene charged to the first reduction step.

*Example III*

Cyclododecene (5.0 g., 0.03 mol) was dissolved in 60 ml. of glacial acetic acid and treated in a tubular reactor at 0° C. with an ozone stream containing approximately 4 wt. percent ozone until one molar equivalent had been absorbed. The resulting solution was heated to refluxing (95° C. to 100° C.) while oxygen containing approximately 0.1 wt. percent ozone was passed through the mixture at about 0.5 liter/minute. After one hour at reflux, one ml. of a 10% solution of cobaltous acetate tetrahydrate in acetic acid was added and the solution refluxed one hour longer. Only a trace of peroxide remained at this point. To hot solution of product was added 50 ml. of water and the mixture allowed to cool to room temperature for crystallization. The product was filtered, and the crystals were washed with several small portions of water and dried. 1,12-dodecanedioic acid was obtained, M.P. 128° C. to 129° C., amounting to 4.3 g. (62%). From the filtrate was isolated, by subsequent crystallization from aqueous acetic acid, approximately 2 g. of 1,12-dodecanedioic acid (29%).

*Example IV*

The ozonolysis step was repeated as in Example III. The oxidation step was carried out without added cobalt catalyst as follows. The solution of ozonolysis product was heated to refluxing (97°) while passing oxygen containing 0.1% ozone through the solution. This treatment was continued for a total of 3½ hours following which a peroxide test was slightly positive, indicating that most of the peroxides had been converted. The solution was treated with 50 ml. of water, cooled and the crystals collected as above. The yield of 1,12-dodecanedioic acid amounted to 3.5 g. (Ca. 50%), M.P. 131° C. to 133 C. A small amount of dodecanedioic acid remained in the fifiltrate but was separated only with difficulty from the amorphous, peroxidic material remaining.

Having disclosed in Examples I through IV a preferred mode of practicing my invention, along with a general disclosure delineating other applications of the invention, what I desire to protect by Letters Patent should be limited not by the specific examples, but only by the appended claims.

I claim:

1. A method of reducing 1,5,9-cyclododecatriene to cycledodecene which comprises
    contacting said 1,5,9-cyclododecatriene at a temperature from −78° C. to +150° C.,
    with lithium metal in ethyl amine,
    said 1,5,9-cyclododecatriene, lithium metal, and ethyl amine being in mol ratios within the range of about 1:4:4 to about 1:10:20,
    whereby cyclododecene is produced.

2. A method in accordance with claim 1 wherein the temperature is within the range of 5° C. to 20° C.

References Cited in the file of this patent

UNITED STATES PATENTS

| | | |
|---|---|---|
| 2,785,208 | Bain et al. | Mar. 12, 1957 |
| 2,793,238 | Banes et al. | May 21, 1957 |
| 2,851,488 | Elkins | Sept. 9, 1958 |
| 2,848,490 | Niebling et al. | Apr. 19, 1958 |
| 2,971,981 | Aries | Feb. 14, 1961 |
| 3,070,626 | Convery | Dec. 25, 1962 |

OTHER REFERENCES

Long: Chem. Reviews, vol. 27, pp. 437–488 (1940).
Campbell et al.: Chem. Reviews, vol. 31, page 87 (1942).
Benekeser et al.: Journal of the American Chemical Society, vol. 77, pp. 3378–3379 (1955).
Benkeser et. al.: (I) Journal of Organic Chemistry, vol. 24, pp. 854–856 (1959).